S. HENRY.
NUT-LOCK.

No. 177,506.

Patented May 16, 1876.

WITNESSES:
Chas Nide
John Goethals

INVENTOR:
Samuel Henry
BY
ATTORNEYS.

UNITED STATES PATENT OFFICE.

SAMUEL HENRY, OF CHENOA, ILLINOIS.

IMPROVEMENT IN NUT-LOCKS.

Specification forming part of Letters Patent No. 177,506, dated May 16, 1876; application filed April 18, 1876.

*To all whom it may concern:*

Figure 1:
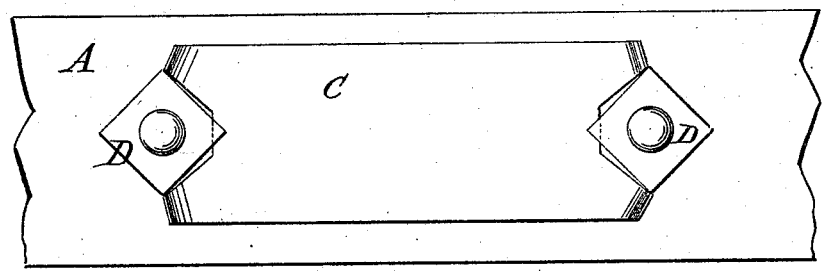
Figure 2:
Figure 3:
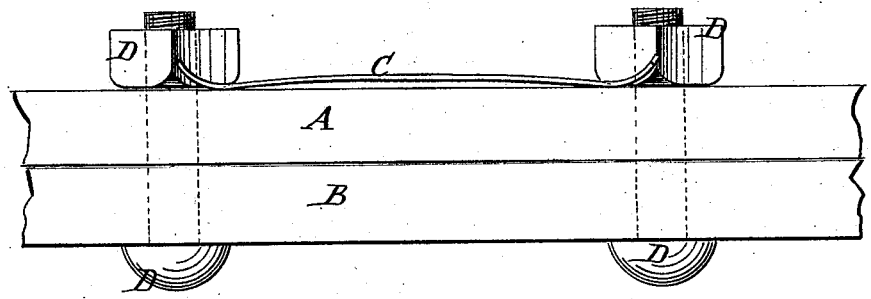

Be it known that I, SAMUEL HENRY, of Chenoa, in the county of McLean and State of Illinois, have invented a new and useful Improvement in Nut-Locks, of which the following is a specification:

Figure 1 is a face view of my improved nut-lock, illustrating its use. Fig. 2 is an edge view of the locking-plate. Fig. 3 is a top view of the arrangement shown in Fig. 1.

Similar letters of reference indicate corresponding parts.

The object of this invention is to furnish an improved device for locking the nuts of the bolts of railroad-rail joints, and of machines subject to a continuous or intermittent jarring, which shall be simple in construction, and convenient and reliable in use, and which will require no extra bolts to hold them, and no extra tools to apply them.

The invention consists in an improved nut-lock formed of the curved plate, having its ends curved upward, and having notches with inclined sides and straight bottom formed in said ends, to adapt it to be applied to the nuts of a pair of bolts, as hereinafter fully described.

A and B represent two bars, which are held together by the two bolts and nuts D. C is a plate of greater breadth than the diagonal measure of the nuts D. The plate C is made of a little greater length than the distance between the two bolts to be locked, and in its ends are formed two notches, made with two equally-inclined sides and a straight bottom, as shown in Fig. 1. These notches are made of such a size as to receive a corner of the nuts D, and the ends are curved upward to rest against the adjacent sides of the said nuts. The middle part of the plate C is curved upward or arched, so that the notched ends may rest against the corners of the nuts D. The middle part of the plate C is then hammered down flat, forcing the square bottoms of the notches beneath the corners of the nuts, and raising its ends upon the sides of said nuts. The nut-lock may be detached by inserting the sharpened handle of a wrench or any other pointed instrument beneath the middle part of the plate, and raising said middle part.

By sharpening the end of the handle of the wrench the locking-plate C may be applied and attached by using the wrench with which the nuts are tightened.

Having thus described my invention, what I claim as new, and desire to secure by Letters Patent, is—

An improved nut-lock, formed of the curved plate C, having its ends curved upward, and having notches with inclined sides and straight bottom formed in said ends, to adapt it to be applied to the nuts of a pair of bolts, substantially as herein shown and described.

SAMUEL HENRY.

Witnesses:
J. E. JEWETT,
N. R. HAYNES.